(12) United States Patent
Bernasconi et al.

(10) Patent No.: US 7,020,168 B2
(45) Date of Patent: Mar. 28, 2006

(54) HIGH POWER MULTI-FREQUENCY LASER

(75) Inventors: Pietro Arturo Giovanni Bernasconi, Eatontown, NJ (US); Barry Irwin Miller, Middletown, NJ (US); Nicholas J. Sauer, Hamilton Square, NJ (US); Lawrence Warren Stulz, Neptune, NJ (US); Dries Van Thourhout, Holmdel, NJ (US); Weiguo Yang, East Windsor, NJ (US); Liming Zhang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 309 days.

(21) Appl. No.: 10/611,221

(22) Filed: Jul. 1, 2003

(65) Prior Publication Data

US 2005/0002424 A1 Jan. 6, 2005

(51) Int. Cl.
*H01S 3/10* (2006.01)

(52) U.S. Cl. .............................. 372/20; 372/23; 385/43; 385/15; 385/20; 385/21

(58) Field of Classification Search .................. 372/20, 372/23; 385/15, 20, 21, 43
See application file for complete search history.

(56) References Cited

U.S. PATENT DOCUMENTS

| | | | | |
|---|---|---|---|---|
| 5,373,517 A | * | 12/1994 | Dragone et al. .............. | 372/20 |
| 5,390,200 A | * | 2/1995 | Zirngibl ......................... | 372/20 |
| 5,450,431 A | * | 9/1995 | Glance et al. ................. | 372/50 |
| 6,243,402 B1 | | 6/2001 | Doerr ............................ | 372/20 |
| 6,327,401 B1 | * | 12/2001 | Doerr et al. ................... | 385/24 |
| 6,665,495 B1 | * | 12/2003 | Miles et al. ................... | 398/54 |
| 6,853,773 B1 | * | 2/2005 | Lin ............................... | 385/39 |
| 2005/0018720 A1 | * | 1/2005 | Kish et al. ..................... | 372/20 |
| 2005/0018721 A1 | * | 1/2005 | Kish et al. ..................... | 372/20 |

OTHER PUBLICATIONS

L. Zhang, "Compact Digitally Tunable Laser", Feb. 2003, IEEE Photonics Technology Letters, vol. 15, No. 2.*

(Continued)

*Primary Examiner*—Minsun Oh Harvey
*Assistant Examiner*—Delma R. Flores-Ruiz

(57) ABSTRACT

A high power multi-frequency laser includes a laser cavity defined by reflective elements, a frequency routing device in the cavity comprising a plurality of frequency selective pathways, a first set of optical amplifiers optically coupled to a first end of the frequency routing device, and a second set of optical amplifiers optically coupling a second end of the frequency routing device and a first one of the reflective elements. The high power multi-frequency laser further includes a power combiner. The power combiner is optically coupled to the first set of optical amplifiers and a second one of the reflective elements and combines the outputs of the first set of optical amplifiers such that a common output for the multi-frequency laser is provided. The common output of the present invention provides a single output from the multi-frequency laser having a high output coupling efficiency.

19 Claims, 4 Drawing Sheets

OTHER PUBLICATIONS

Pietro Bernasconi, "Novel Geometry for an Integrated Channel Selector", Nov./Dec. 2002, IEEE Journal of selected topics in Quantum Electronics, vol. 8, No. 6.*

"Digitally Tunable Laser Based on the Integration of a Waveguide Grating Multiplexer and an Optical Amplifier", M. Zirngibl et al., IEEE Photonics Technology Letters, vol. 6, No. 4, Apr. 1994, pp. 516-518.

"Low-Threshold Nine-Channel Waveguide Grating Router-Based Continuous Wave Transmitter", C. H. Joyner, et al., Journal of Lightwave Technology, vol. 17, No. 4, Apr. 1999, pp. 647-651.

"40-Wavelength Rapidly Digitally Tunable Laser", Doerr et al., IEEE Photonics Technology Letters, vol. 11, No. 11, Nov. 1999, pp. 1348-1350.

* cited by examiner

200

HIGH POWER MULTI-FREQUENCY LASER

CROSS-REFERENCE TO RELATED APPLICATIONS

This application is related to U.S. Pat. No. 6,243,402 B1 issued Jun. 5, 2001, which is incorporated herein by reference in its entirety.

FIELD OF THE INVENTION

The present invention relates to the field of optical communications and, more specifically, to lasers used in optical communication systems.

BACKGROUND OF THE INVENTION

As wavelength division multiplexed (WDM) networks containing large numbers of wavelength channels are becoming more common, the need for multi-wavelength/multi-frequency sources is increasingly important. Multi-frequency sources, such as tunable lasers, have the ability to tune to different frequencies either continuously over some allowable range or at discrete wavelength values. Since each channel in a WDM optical communication system operates at a distinct wavelength, multi-wavelength sources, such as tunable lasers, are essential to relieve inventory and stockpiling issues associated with systems with a discrete source for each wavelength.

Multi-frequency lasers can be realized by monolithically integrating a frequency routing device, such as a waveguide grating router (AWG), and an array of semiconductor amplifiers (SOAs) into a single laser cavity. Initially, multi-frequency lasers required a separate SOA for each wavelength channel, thereby limiting the maximum channel count. Subsequently though, in improved designs, the total number of required SOAs was reduced to a number proportional to twice the square root of the total channel count.

A disadvantage of the improved multi-frequency laser designs having reduced numbers of SOAs though, is the small fraction of the laser light in the laser cavity that can be extracted, which limits the maximum obtainable output power of these multi-frequency lasers. This problem originates from the fact that in such multi-frequency laser designs it is difficult to bring all channels together in one common output waveguide. Therefore, the power had to be extracted from one of the outer waveguides of the AWG itself, which is able to capture only a small fraction of the lasing power.

SUMMARY OF THE INVENTION

The present invention addresses these and other deficiencies in the art by providing for multi-frequency lasers with relatively high power outputs and reduced numbers of optical amplifiers.

In one embodiment of the present invention, a multi-frequency laser includes a laser cavity defined by reflective elements, a frequency routing device in the cavity comprising a plurality of frequency selective pathways, a first set of optical amplifiers optically coupled to a first end of the frequency routing device, and a second set of optical amplifiers optically coupling a second end of the frequency routing device and a first one of the reflective elements. The multi-frequency laser further includes a power combiner. The power combiner is optically coupled to the first set of optical amplifiers and a second one of the reflective elements and combines the outputs of the first set of optical amplifiers such that a common output for the multi-frequency laser is provided.

In an alternate embodiment of the present invention, a method for providing a high power output of a multi-frequency laser having a first plurality of optical amplifiers optically coupled to a first end of a frequency routing device and a second plurality of optical amplifiers optically coupled to a second end of the frequency routing device, includes combining, outside of a frequency routing device and within a laser cavity of the multi-frequency laser, the first plurality of optical amplifiers into a single output. The method may further include amplifying the combined outputs prior to exiting the multi-frequency laser cavity.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides for multi-frequency lasers with relatively high power outputs and reduced numbers of optical amplifiers. Although the concepts of the present invention are being described with respect to specific embodiments of multi-frequency lasers, it will be appreciated by those skilled in the relevant art informed by the teachings of the present invention, that the concepts of the present invention may be implemented in various other embodiments of multi-frequency lasers to provide for a reduced number of optical amplifiers and relatively high power outputs.

Figure 1:
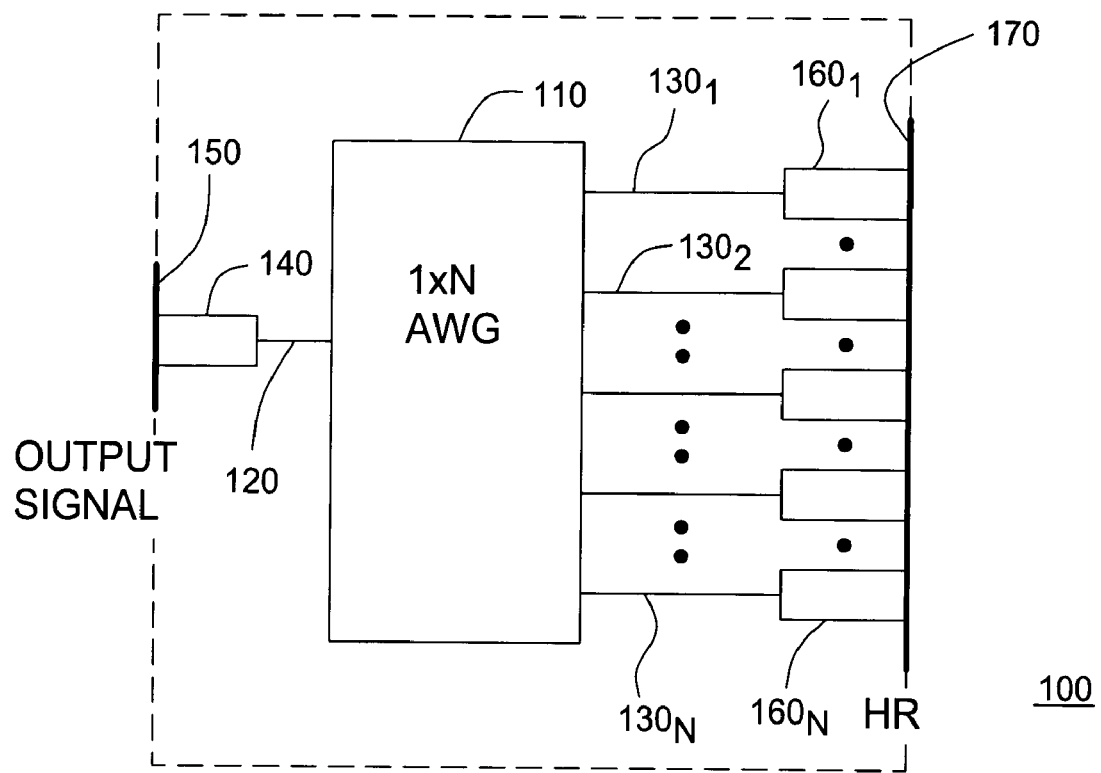
FIG. 1 depicts a high level block diagram of an embodiment of a prior art multi-frequency laser

FIG. 1 depicts a high level block diagram of an embodiment of a prior art multi-frequency laser. The multi-frequency laser 100 of FIG. 1 comprises an 1×N arrayed waveguide grating (AWG) 110, a single waveguide 120 connected to one end of the AWG 110 and a plurality of waveguides $130_1, 130_2, \ldots, 130_N$ (collectively waveguides 130) connected to a second end of the AWG 110. An amplifier 140 connects the single waveguide 120 to a cleaved face 150. A plurality of optical amplifiers $160_1 \ldots 160_N$ (collectively optical amplifiers 160) connect respective ones of the plurality of waveguides 130 to a second cleaved face 170. The two cleaved faces 150 and 170 comprise reflective mirrors defining a tuned cavity in which lasing action can be supported. The single waveguide 120 permits all of the frequencies (channels) from the AWG 110 to be output on the same output waveguide 120. In addition, a control circuit (not shown) selectively provides bias current to predetermined ones of the optical amplifiers to produce laser light at one discrete frequency.

In the prior art multi-frequency laser 100 of FIG. 1, each optical amplifier comprises a doped section of waveguide with controllable optical transmissivity. The doping may be such that an appropriately configured semiconductor junction is defined in each optical amplifier. These sections are optically active in that application of electrical energy to those sections will cause them to become transmissive to the flow of optical energy and will even provide some degree of gain to optical signals flowing through them. When electrical bias current above a lasing threshold is applied, laser action begins. These doped sections of waveguide are substantially opaque to the transmission of light when there is no applied electrical stimulation. The specially doped sections thus may be considered to be gates or optical amplifiers depending upon whether or not they are excited with electrical energy. The details of the operation of a multi-frequency laser, such as the prior art multi-frequency laser 100 of FIG. 1, are generally known, and thus are not described in further detail herein.

An advantage of prior art multi-frequency lasers, such as the multi-frequency laser 100 of FIG. 1, is that all of the frequencies of the device propagate through a single output waveguide 120. The single output waveguide 120 reduces the losses attributed to output coupling. A great disadvantage of multi-frequency lasers, such as the multi-frequency laser 100 of FIG. 1, however is that such a device requires a separate amplifier for each channel. For example, a multi-frequency laser supporting twenty channels would require twenty lasers to amplify and provide lasing for all of the twenty channels.

Figure 2:
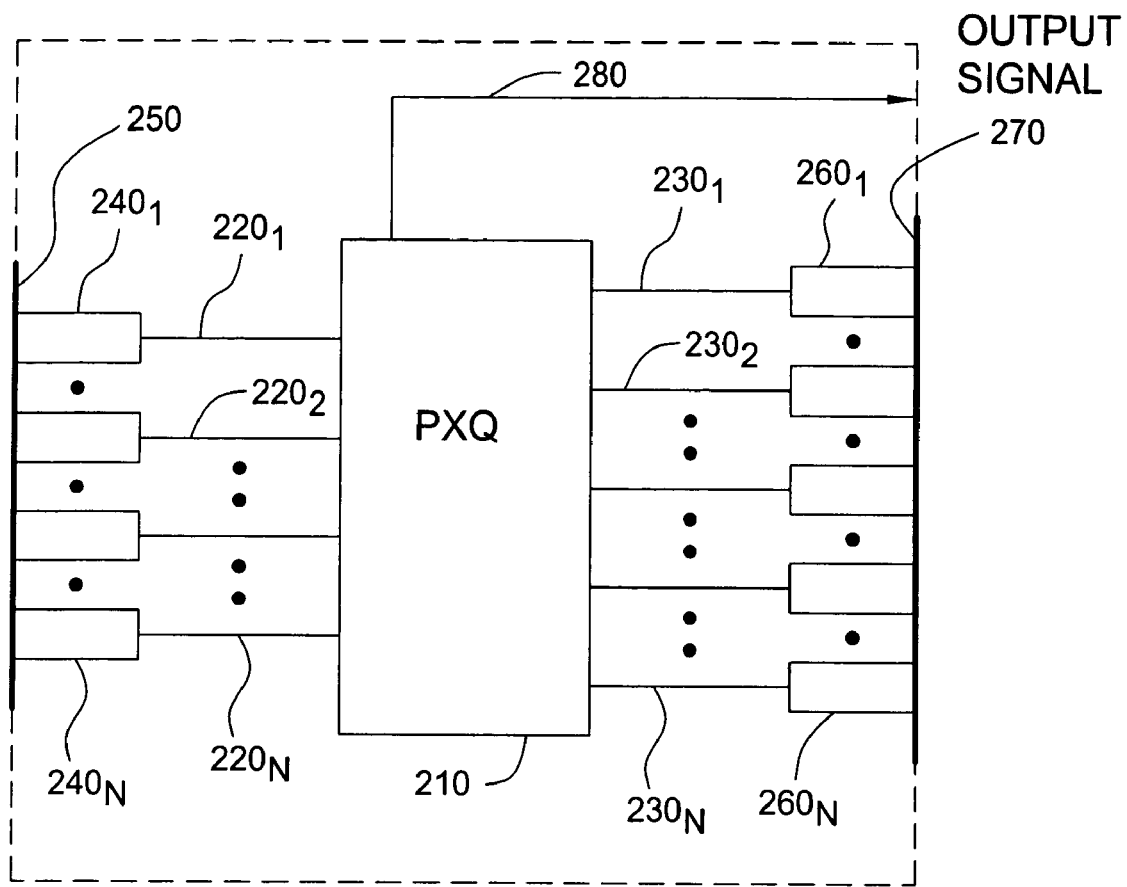
FIG. 2 depicts a high level block diagram of an embodiment of an improved multi-frequency laser.

FIG. 2 depicts a high level block diagram of an embodiment of an improved multi-frequency laser. Such an improved multi-frequency laser is described in U.S. Pat. No. 6,243,402 entitled "Multi-Frequency Rapidly Tunable Laser", issued Jun. 5, 2001 to Christopher Doerr, which is herein incorporated by reference in its entirety. The multi-frequency laser 200 of FIG. 2 comprises a P×Q AWG 210, a first plurality of waveguides $220_1, 220_2, \ldots, 220_N$ (collectively waveguides 220) connected to one end of the frequency routing device 210 and a second plurality of waveguides $230_1, 230_2, \ldots, 230_N$ (collectively waveguides 230) connected to a second end of the AWG 210. A first plurality of optical amplifiers $240_1, \ldots 240_N$ (collectively optical amplifiers 240) connects respective ones of the first plurality of waveguides 220 to a cleaved face 250. A second plurality of optical amplifiers $260_1 \ldots 260_N$ (collectively optical amplifiers 260) connects respective ones of the second plurality of waveguides 230 to a second cleaved face 270. The two cleaved faces 250 and 270 comprise reflective mirrors defining a tuned cavity in which lasing action can be supported.

In the multi-frequency laser 200 of FIG. 2, a control circuit (not shown) selectively provides bias current to predetermined ones of the optical amplifiers to produce laser light at one or more discrete frequencies. In multi-frequency lasers, such as the multi-frequency laser 200 of FIG. 2, selectively applying bias current to predetermined ones of the optical amplifiers will create certain frequency selective optical pathways between the cleaved faces due to the behavior of AWG 210. That is, in the AWG, each frequency is carried by a different length waveguide to output waveguides and amplifiers. As such, application of an amount of bias current above a lasing threshold to the selected ones of the optical amplifiers will cause lasing action at a frequency supported in the frequency selective optical pathways. The selected lasing frequency is then output along the output waveguide 280.

Similar to the prior art multi-frequency laser of FIG. 1, in the improved multi-frequency laser 200 of FIG. 2, each optical amplifier comprises a doped section of waveguide with controllable optical transmissivity. The doping may be such that an appropriately configured semiconductor junction is defined in each optical amplifier. These sections are optically active in that application of electrical energy to those sections will cause them to become transmissive to the flow of optical energy and will even provide some degree of gain to optical signals flowing through them. When electrical bias current above a lasing threshold is applied, laser action begins. These doped sections of waveguide are substantially opaque to the transmission of light when there is no applied electrical stimulation. The specially doped sections thus may be considered to be gates or optical amplifiers depending upon whether or not they are excited with electrical energy.

The multi-frequency laser 200 of FIG. 2 further comprises an output waveguide 280. The output waveguide 280 of the multi-frequency laser of FIG. 2 is coupled to the AWG 210 and permits all of the frequencies (channels) from the AWG 210 to be output on the same output waveguide 280. For example, in the Doerr patent described above, an output waveguide is coupled to the grating arm inlets of a star coupler, thus permitting all of the channels to appear on a same output waveguide.

An advantage of an improved multi-frequency laser, such as the multi-frequency laser 200 of FIG. 2, is that the number of required optical amplifiers is reduced compared to the prior art multi-frequency laser 100 of FIG. 1. In the multi-frequency laser 200 of FIG. 2, the number of optical amplifiers required is reduced to a number proportional to twice the square root of the total channel count. That is, for example, in the multi-frequency laser 200 of FIG. 2 having N=P×Q channels, the number of optical amplifiers required is P+Q, which may be minimized to approximately twice the square root of the total channel count, N.

Another advantage of an improved multi-frequency laser, such as the multi-frequency laser 200 of FIG. 2, is that all of the frequencies of the device propagate through a single output waveguide 280. However, the coupling of the single output waveguide 280 from the AWG 210 results in very low external efficiencies. Typical output coupling ratios for multi-frequency lasers, such as the multi-frequency laser 200 of FIG. 2, are measured and estimated to be on the order of one percent (1%) of the lasing power, which is typically in the range of −20 dBm. By using a booster amplifier on the output waveguide 280, an average output power of −10 dBm may be obtained.

The present invention advantageously provides a multi-frequency laser having a single output port with reduced output coupling loss as compared to known multi-frequency lasers, such as the multi-frequency laser of FIG. 2. Unlike the multi-frequency lasers of FIG. 2, a multi-frequency laser in accordance with the present invention provides a single common output waveguide within the cavity of the laser for all possible channel combinations that does not suffer from low external efficiency. In addition, a multi-frequency laser in accordance with the present invention does not require an optical amplifier for each available channel and, as such has a reduced number of optical amplifiers.

Figure 3:
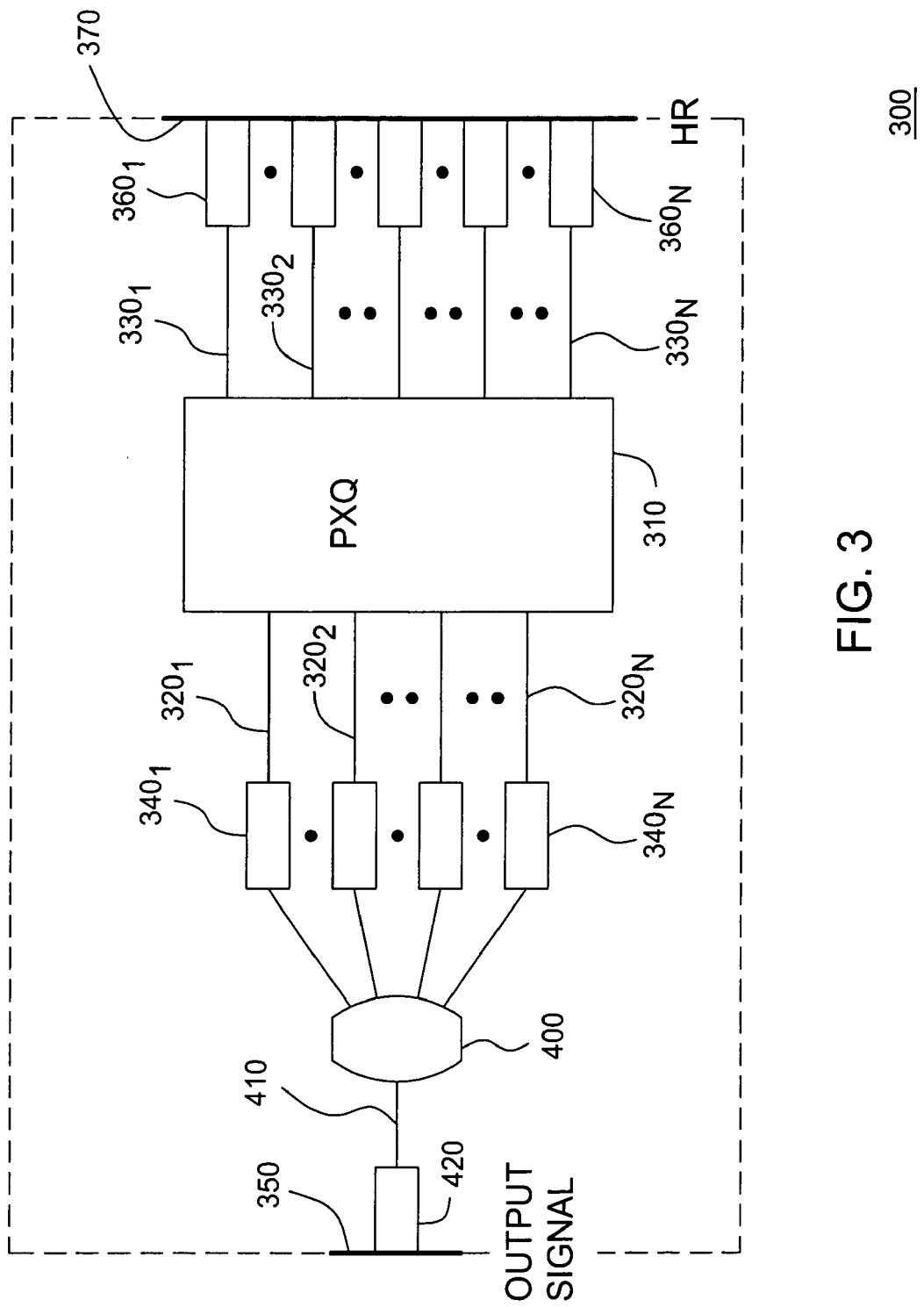
FIG. 3 depicts a high level block diagram of a multi-frequency laser in accordance with the present invention.

FIG. 3 depicts a high level block diagram of an embodiment of a multi-frequency laser in accordance with the present invention. The multi-frequency laser 300 of FIG. 3 illustratively comprises a P×Q frequency routing device 310, a first plurality of waveguides $320_1, 320_2, \ldots, 320_N$ (collectively waveguides 320) connected to one end of the frequency routing device 310 and a second plurality of waveguides 330₁, 330₂, . . . , 330_N (collectively waveguides 330) connected to a second end of the frequency routing device 310. A first plurality of optical amplifiers (illustratively, silicon optical amplifiers) 340₁ . . . 340_N (collectively silicon optical amplifiers 340) connect the first plurality of waveguides 320 to a first end of a power combiner (illustratively a star coupler) 400. A single waveguide 410 connects a second end of the star coupler 400 to a booster amplifier 420. The booster amplifier 420 connects the single waveguide 410 to a cleaved face 350. A second plurality of optical amplifiers (illustratively, silicon optical amplifiers) 360₁ . . . 360_N (collectively silicon optical amplifiers 360) connect respective ones of the second plurality of waveguides 330 to a highly reflective face 370. The cleaved face 350 and the highly reflective (HR) face 370 define a tuned cavity in which lasing action can be supported. In addition, a control circuit (not shown) selectively provides bias current to predetermined ones of the first and second plurality of silicon optical amplifiers 340, 360 to produce laser light at one discrete frequency.

Although in the multi-frequency laser 300 of FIG. 3, the power combiner is depicted as a star coupler, other components comprising substantially similar functionality, such as multimode interference (MMI) couplers, may be implemented within a multi-frequency laser in accordance with the present invention for performing the combining of the channels. The combiner may be substantially any device that combines the power from its input waveguides into a single channel. Furthermore, although the multi-frequency laser 300 of FIG. 3 is depicted as comprising a booster amplifier 420, a multi-frequency laser in accordance with the present invention may or may not comprise a booster amplifier. That is, in alternate embodiments of the present invention, a multi-frequency laser in accordance with the present invention may be configured without a booster amplifier on the output waveguide. In the embodiment of the multi-frequency laser 300 of FIG. 3, the booster amplifier 420 is illustratively added to compensate for losses incurred by the star coupler 400.

In the multi-frequency laser 300 of FIG. 3, a bias current is provided to a single silicon optical amplifier of the first plurality of silicon optical amplifiers 340 and a single silicon optical amplifier of the second plurality of silicon optical amplifiers 360 to produce laser light at one discrete frequency. When the electrical bias current provided to a pair of optical amplifiers rises above a lasing threshold, laser action for that selected discrete frequency begins. The lasing frequency resonates in the optical cavity between the cleaved face 350 and the highly reflective face 370 traveling through the star coupler 400. When the lasing power rises above a predetermined threshold value, the lasing frequency is output from the multi-frequency laser 300 through the star coupler 400 via the single output waveguide 410. As such, a total of $N=P\times Q$ different lasing wavelengths may be output from said multi-frequency laser 300 on a single, common output by providing a bias to all possible combinations of one optical amplifier of the first plurality of silicon optical amplifiers 340 and one optical amplifier of the second plurality of silicon optical amplifiers 360. Similarly, a bias current may be provided to more than one silicon optical amplifier of the first plurality of silicon optical amplifiers 340 and more than one silicon optical amplifier of the second plurality of silicon optical amplifiers 360 to produce laser light at multiple frequencies. The star coupler 400 in the laser cavity of the multi-frequency laser 300 combines the outputs of the frequency routing device 310 into a single waveguide 410, outside of the frequency routing device 310 and within the laser cavity, that is shared by all the frequencies of the multi-frequency laser 300. The star coupler 400 and the single output waveguide 410 provide a single common output for the multi-frequency laser 300 having a high external efficiency and providing much higher output power levels for the lasing frequencies. The star coupler 400 and single waveguide 410 are capable of being integrated on a single chip within the laser cavity of the multi-frequency laser 300. In the embodiment of the multi-frequency laser 300 of FIG. 3, the amplifier 420 is illustratively added to compensate for losses incurred by the star coupler 400.

An inventive multi-frequency laser in accordance with the present invention, such as the multi-frequency laser 300 of FIG. 3, advantageously provides a means for outputting all of the frequencies (channels) of a frequency routing device on a single output waveguide having much higher output power levels compared to prior art solutions. In addition, the number of optical amplifiers required by a multi-frequency laser in accordance with the present invention is a number proportional to twice the square root of the total channel count.

In an experiment, the inventors realized a 32-channel monolithically integrated device (P=4, Q=8) in InP/InGaAsP comprising a configuration in accordance with the present invention, such as the multi-frequency laser of FIG. 3. A gain layer consisting of 4 compressively strained InGaAsP layers surrounded by tensile strained InGaAsP Q1.30 barrier layers was used. A HR-coating was applied to a back facet of the multi-frequency laser while the front side was left as cleaved. Although the output waveguide was angled with respect to the facet, the residual reflections were strong enough to sustain laser operation with average threshold currents as low as 25 mA per amplifier. If the booster amplifier was replaced by a passive waveguide, the threshold current for the two remaining amplifier groups increased to 40 mA per amplifier. The positions of the input and output waveguides to the frequency routing device were chosen in such a way that only the central ⅔ of the Brillouin zone were used resulting in an improved power uniformity.

Figure 4:
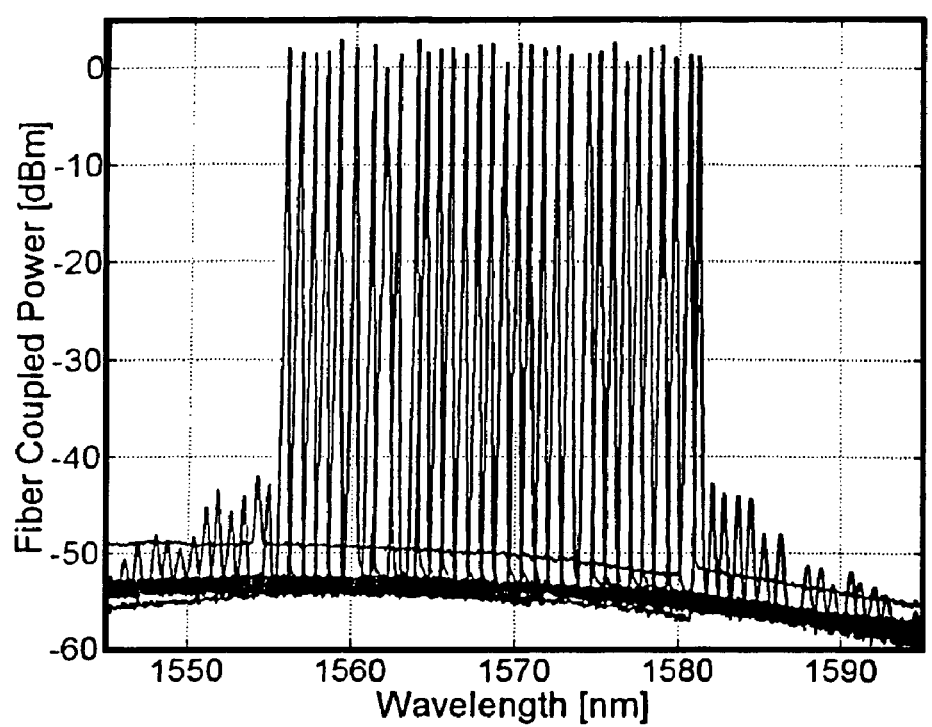
FIG. 4 graphically depicts an output spectra for a multi-frequency laser in accordance with the present invention.

FIG. 4 graphically depicts the laser spectra for all 32 channels of the multi-frequency laser described above, measured one at a time with a 0.1 nm resolution bandwidth. FIG. 4 illustratively plots the power of the output channel versus the wavelength of each of the 32 channels measured using a lensed optical fiber. The booster amplifier and the amplifiers at the input and output of the frequency routing device were driven with a bias current of 100 mA each (except for the two outermost channels, which were driven using slightly asymmetric current settings to prevent multi-passband lasing resulting in a higher amplifier spontaneous emission (ASE)-floor for one of those channels). As evident in FIG. 4, an average output power of 2 dBm was obtained from the single output waveguide coupled to the star coupler. On average, the amplified spontaneous emission was suppressed by more than 50 dB. For most channels, up to 3.5 dBm of fiber coupled power could be obtained for bias currents of 100 to 130 mA per amplifier.

In alternate embodiments of the present invention, the frequency routing device may be chirped to eliminate multi-passband lasing and to reduce the size of the grating. In addition, a non-angled output waveguide may be used to decrease the cavity losses considerably and thereby lead to lower threshold currents and even higher output power.

As such, a multi-frequency laser in accordance with the present invention is capable of providing the optical power levels required in many optical networks and may be implemented as a useful network device in many future applications.

While the forgoing is directed to various embodiments of the present invention, other and further embodiments of the invention may be devised without departing from the basic scope thereof. As such, the appropriate scope of the invention is to be determined according to the claims, which follow:

What is claimed is:

1. A multi-frequency laser comprising:
    a laser cavity defined by reflective elements;
    a frequency routing device in said cavity comprising a plurality of frequency selective pathways;
    a first plurality of optical amplifiers optically coupled to a first end of said frequency routing device;
    a second plurality of optical amplifiers optically coupling a second end of said frequency routing device and a first one of said reflective elements;
    a power combiner optically coupled to said first plurality of optical amplifiers and a second one of said reflective elements for providing a single, common output for said multi-frequency laser; and
    an amplifier for amplifying an output signal of said power combiner.

2. The multi-frequency laser of claim 1, wherein said reflective elements are mirrors.

3. The multi-frequency laser of claim 1, wherein the first one of said reflective elements comprises a highly reflective coating.

4. The multi-frequency laser of claim 1, wherein said power combiner is optically coupled to the second one of said reflective elements via a waveguide, said waveguide providing a single, common output for said multi-frequency laser.

5. The multi-frequency laser of claim 4, wherein said waveguide comprises a non-angled output waveguide such that cavity losses are decreased.

6. The multi-frequency laser of claim 1, wherein said power combiner comprises a star coupler.

7. The multi-frequency laser of claim 6, wherein an output of said star coupler propagates through an output waveguide and a booster amplifier before being output from said cavity.

8. The multi-frequency laser of claim 1, wherein said power combiner comprises a multimode interference coupler.

9. The multi-frequency laser of claim 1, wherein the output power is greater than 1 dBm.

10. The multi-frequency laser of claim 1, wherein said frequency routing device is chirped to eliminate multi-passband lasing.

11. The multi-frequency laser of claim 1, wherein said frequency routing device comprises an arrayed waveguide grating.

12. The multi-frequency laser of claim 11, wherein said frequency routing device is chirped to eliminate multi-passband lasing and to reduce the size of the grating.

13. The multi-frequency laser of claim 1, wherein the number of optical amplifiers is substantially equal to twice the square root of the number of channels of said multi-frequency laser.

14. The multi-frequency laser of claim 1, wherein said first plurality of optical amplifiers and said second plurality of optical amplifiers comprise silicon optical amplifiers.

15. A method of providing a high power output of a multi-frequency laser having a first plurality of optical amplifiers optically coupled to a first end of a frequency routing device and a second plurality of optical amplifiers optically coupled to a second end of said frequency routing device, comprising:
    combining, outside of said frequency routing device and within a laser cavity of said multi-frequency laser, the outputs of said first plurality of optical amplifiers into a single output; and amplifying said single output with said laser cavity.

16. The method of claim 15, wherein the combining of the outputs of said first plurality of optical amplifiers results in an improved output coupling efficiency for said multi-frequency laser.

17. The method of claim 15, wherein said combining is performed via a power combiner.

18. The method of claim 17, wherein said power combiner comprises a star coupler.

19. The method of claim 17, wherein said power combiner comprises a multimode interference coupler.

* * * * *